(12) United States Patent  (10) Patent No.: US 8,191,907 B2
Watson  (45) Date of Patent: Jun. 5, 2012

(54) MULTI-USE WAGON

(76) Inventor: Diane H. Watson, Starkville, MS (US)

( * ) Notice: Subject to any disclaimer, the term of this patent is extended or adjusted under 35 U.S.C. 154(b) by 419 days.

(21) Appl. No.: 12/572,911

(22) Filed: Oct. 2, 2009

(65) Prior Publication Data

US 2011/0079972 A1  Apr. 7, 2011

(51) Int. Cl.
B60N 2/26 (2006.01)
B60N 2/005 (2006.01)
B62B 3/02 (2006.01)
B62B 7/12 (2006.01)
B62B 5/08 (2006.01)

(52) U.S. Cl. ....... 280/30; 280/658; 280/47.34; 280/79.2

(58) Field of Classification Search ............ 280/30, 280/37, 648, 643, 651, 657, 658, 47.34, 79.11, 280/79.2
See application file for complete search history.

(56) References Cited

U.S. PATENT DOCUMENTS

| | | | |
|---|---|---|---|
| D369,695 S | 5/1996 | Imotani | |
| 6,318,740 B1 * | 11/2001 | Nappo | 280/87.01 |
| 6,497,424 B2 | 12/2002 | Gartner et al. | |
| 6,641,149 B2 | 11/2003 | Chiappetta et al. | |
| D483,419 S | 12/2003 | Chiappetta et al. | |
| 6,802,516 B2 * | 10/2004 | Schuerman et al. | 280/47.371 |
| 6,932,365 B2 * | 8/2005 | Chiappetta et al. | 280/47.371 |
| 7,017,923 B1 | 3/2006 | Holman | |
| D582,217 S * | 12/2008 | Libby et al. | D7/606 |
| 7,487,977 B2 | 2/2009 | Johnson | |
| 7,694,981 B2 * | 4/2010 | Heath et al. | 280/79.11 |
| 7,891,678 B2 * | 2/2011 | Anderson et al. | 280/47.35 |
| 2002/0060438 A1 * | 5/2002 | Gartner et al. | 280/79.2 |
| 2002/0093159 A1 | 7/2002 | Turner et al. | |
| 2004/0025531 A1 * | 2/2004 | Holloman-Hughes et al. | 62/457.7 |

* cited by examiner

Primary Examiner — John R Olszewski
(74) Attorney, Agent, or Firm — George R. Reardon (57) ABSTRACT

A multi-use wagon is disclosed. The wagon includes a body supported by a plurality of wheels, front and rear seats disposed within the body, and forward and rear back-support panels pivotably coupled to the front and rear seats to provide back support and to selectively fold to create a table top surface. The seats are removable. The wagon also includes left and right side panels pivotably coupled to the body, wherein the left and right side panels are configured to be operatively placed in one of three positions: to be used in a stowed position at a left and right sides, respectively, of the wagon body, to be lifted to provide upper side support to the wagon body while carrying a child or cargo, and to operatively fold, outwardly to provide a right or left side portion, respectively, of the table top surface. The wagon includes an insulated chest.

18 Claims, 13 Drawing Sheets

MULTI-USE WAGON

FIELD OF THE INVENTION

The technology described herein relates generally to the fields of toy wagons for children, portable coolers, and portable tables. More specifically, this technology relates to a multi-use wagon for children and cargo that provides for use as a toy wagon, a portable cooler, and a portable table.

BACKGROUND OF THE INVENTION

The use of children's toy wagons is known in the prior background art. Likewise, portable coolers predominantly used for cool storage and transport of food and beverages are well known. There are a large variety of these types of products ranging widely in size, shape, materials, and colors/styles.

More specifically, children's toy wagons and portable coolers heretofore devised and utilized are known to consist basically of familiar, expected, and apparent structural configurations, notwithstanding the multiplicity of designs encompassed by the crowded prior background art which have been developed for the fulfillment of countless objectives and requirements.

Related design patents known in the background art include the following: U.S. Pat. No. D369,695, issued to Imotani on May 14, 1996, discloses the ornamental design for an ice-box with a folding table. U.S. Pat. No. D483,419, issued to Chiappetta et al. on Dec. 9, 2003, discloses the ornamental design for a wagon with hideaway seats. U.S. Pat. No. D582,217, issued to Libby et al. on Dec. 9, 2008, discloses the ornamental design for a zamboni cooler.

Related utility patents known in the background art include the following: U.S. Pat. No. 6,318,740, issued to Nappo on Nov. 20, 2001, discloses a toy wagon and cooler combination. U.S. Pat. No. 6,497,424, issued to Gartner et al. on Dec. 24, 2002, discloses a combination ice-chest stroller. U.S. Pat. No. 6,641,149, issued to Chiappetta et al. on Nov. 4, 2003, discloses a children's wagon with improved removable walls. U.S. Pat. No. 6,932,365, issued to Chiappetta et al. on Aug. 23, 2005, discloses a convertible toy wagon. U.S. Pat. No. 7,017,923, issued to Holman on Mar. 28, 2006, discloses a sport wagon bench. U.S. Pat. No. 7,487,977, issued to Johnson on Feb. 10, 2009, discloses a multiple configuration children's wagon.

Related published patent application known in the background art include the following: U.S. Published Patent Application No. 2002/0093159, filed by Turner et al. on Jul. 18, 2002, discloses a juvenile stroller with cooler. U.S. Published Patent Application No. 2004/0025531, filed by Holloman-Hughes et al. on Feb. 12, 2004, discloses an insulated cooler having an integral seat.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a multi-use wagon for children and cargo that provides for use as a toy wagon, a portable cooler, and a portable table.

In one exemplary embodiment, the technology described herein provides a wagon. The wagon includes: a wagon body supported by a plurality of wheels; front and rear seats disposed within the wagon body; and forward and rear back-support panels pivotably coupled to the front and rear seats to provide back support and to selectively fold to create a table top surface. The rear and front seats are removable from the wagon body.

The wagon can also include left and right side panels pivotably coupled to the wagon body, wherein the left and right side panels are configured to be operatively placed in one of three positions: to be used in a stowed position at a left and right sides, respectively, of the wagon body, to be lifted to provide upper side support to the wagon body while carrying a child or cargo, and to operatively fold, outwardly to provide a right or left side portion, respectively, of the table top surface.

The wagon can further include an insulated chest. The insulated chest can include a base and front, rear, right, and left sides, and a removable lid configured to sealably close a top of the insulated chest. The insulated chest can be placed within the wagon body centrally between the front and rear seats. The insulated chest is removable from the wagon body.

In another exemplary embodiment, the technology described herein provides a multi-use wagon. The multi-use wagon includes: a wagon body supported by a plurality of wheels and operatively pulled by a handle; a rear seat disposed within the wagon body; a front seat disposed within the wagon body; a rear back-support panel, the rear back-support panel configured to provide back support to a seated child in the rear seat and to fold inwardly to form a rear portion of a table top; and a forward back-support panel, the forward back-support panel configured to provide back support to a seated child in the front seat and to fold inwardly to form a forward portion of the table top. The rear and front seats are removable from the wagon body.

The multi-use wagon can also include a left side panel, the left side panel configured to be used in a stowed position at the left side of the wagon body, to be lifted to an upright position to provide left side support to the wagon body while carrying a child or cargo, and to operatively fold, outwardly to provide a left portion of the table top; and a right side panel, the right side panel configured to be used in a stowed position at the right side of the wagon body, to be lifted to an upright position to provide right side support to the wagon body while carrying a child or cargo, and to operatively fold, outwardly to provide a right portion of the table top.

The multi-use wagon can further include: an insulated chest, the insulated chest having a base and front, rear, right, and left sides and being disposed within the wagon body centrally between the front and rear seats; and a lid, the lid configured to enclose the insulated chest at a top side and operatively removable from the insulated chest. The insulated chest is removable from the wagon body.

The multi-use wagon can further include: a back-support panel pin disposed on each upper end of both the rear back-support panel and forward back-support panel; and a pin notch disposed on each upper, inner corner of the left side panel and the right side panel, each pin notch configured to receive one of the back support panel pins and thereby secure the rear and forward back-support panels to the left and right side panels, respectively, when the left and right side panels are upwardly extended to the upright position.

The multi-use wagon can also include a plurality of tracks disposed on each of a left and a right side of the wagon body and configured for receipt of the left and right side panels in one of three operatively selected positions.

The multi-use wagon can further include a pair of back-support panel tracks for each of the rear and forward back-support panels, each pair of back-support panel tracks disposed within an interior of the wagon body and configured to provide a movement path for the operative placement of the rear and forward back-support panels.

The insulated chest within the multi-use wagon can further include: a drain hole disposed within the ice chest; a drain plug, the drain plug configured to sealably close the drain hole of the insulated chest; a drain cap; and at least one handle disposed upon the insulated chest.

In yet another exemplary embodiment, the technology described herein provides a combination, interchangeable children's wagon, ice chest, and table. The combination, interchangeable children's wagon, ice chest, and table includes: a wagon body supported by a plurality of wheels and operatively pulled by a handle, the wagon body having a floor and front, rear, right, and left sides, defining an interior of the wagon body; a rear seat disposed within the wagon body; a front seat disposed within the wagon body; a rear back-support panel, the rear back-support panel configured to provide back support to a seated child in the rear seat and to fold inwardly to form a central rear portion of a table top; a forward back-support panel, the forward back-support panel configured to provide back support to a seated child in the front seat and to fold inwardly to form a central forward portion of the table top; a left side panel, the left side panel configured to be used in a stowed position at the left side of the wagon body, to be lifted to provide left side support to the wagon body while carrying a child or cargo, and to operatively fold, outwardly to provide a left portion of the table top; a right side panel, the right side panel configured to be used in a stowed position at the right side of the wagon body, to be lifted to provide right side support to the wagon body while carrying a child or cargo, and to operatively fold, outwardly to provide a right portion of the table top; and an insulated chest, the insulated chest being disposed within the wagon body centrally between the front and rear seats and having a lid, the lid configured to enclose the insulated chest at a top side and operatively removable from the insulated chest.

The rear and front seats are removable from the wagon body. The insulated chest is removable from the wagon body.

The combination, interchangeable children's wagon, ice chest, and table can also include: a back-support panel pin disposed on each upper end of both the rear back-support panel and forward back-support panel; and a pin notch disposed on each upper, inner corner of the left side panel and the right side panel, each pin notch configured to receive one of the back support panel pins and thereby secure the rear and forward back-support panels to the left and right side panels, respectively, when the left and right side panels are upwardly extended to the upright position.

The combination, interchangeable children's wagon, ice chest, and table can further include a plurality of tracks disposed on each of a left and a right side of the wagon body and configured for receipt of the left and right side panels in one of three operatively selected positions.

The combination, interchangeable children's wagon, ice chest, and table can further include a pair of back-support panel tracks for each of the rear and forward back-support panels, each pair of back-support panel tracks disposed within an interior of the wagon body and configured to provide a movement path for the operative placement of the rear and forward back-support panels.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a multi-use wagon 10 for children and cargo that provides for use as a toy wagon, a portable cooler, and a portable table. The multi-use wagon 10 is easily reconfigured by an operator for varied uses dependent on the passengers, cargo, and other needs for use of the wagon.

In one exemplary embodiment, the technology described herein provides a multi-use wagon 10. The multi-use wagon 10 includes a wagon body 14. The wagon body 14 includes a wagon floor 72 and front, rear, right, and left sides, together defining an interior of the wagon body 14. The multi-use wagon 10 can include accessory items, such as for example, cup holders 66. The wagon body 14 is manufactured from a durable plastic product in at least one embodiment. Alternatively, some components of the wagon 10 can be manufactured from metal and wood.

Figure 9:
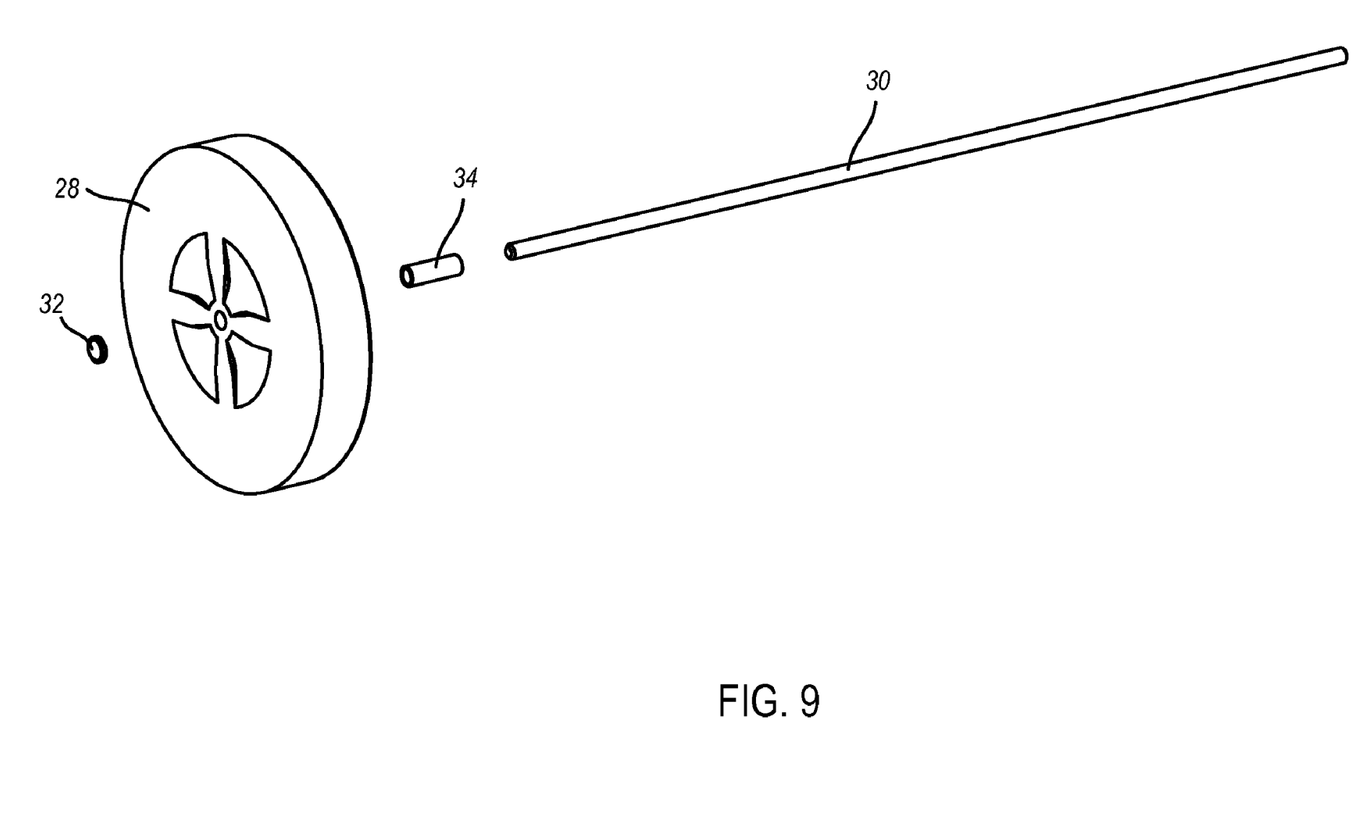
FIG. 9 is a perspective view of an axle and a wheel for the multi-use wagon, according to an embodiment of the technology described herein.

The wagon 10 is supported by a multiplicity of wheels 28. As depicted specifically in FIG. 9, a wheel 28 attaches to axle 30. The wheel 28 is secured to axle 30 with axle rod sleeve 34 and axle rod cap 32. Each axle 30 supports two wheels 28. The axle 30, axle rod sleeve 34, and axle rod cap 32 are preferably manufactured of a durable metal. Wheels 28 can be fixed in alignment. Alternatively, at least two or all four of the wheels can be swivel wheels.

Figure 11:
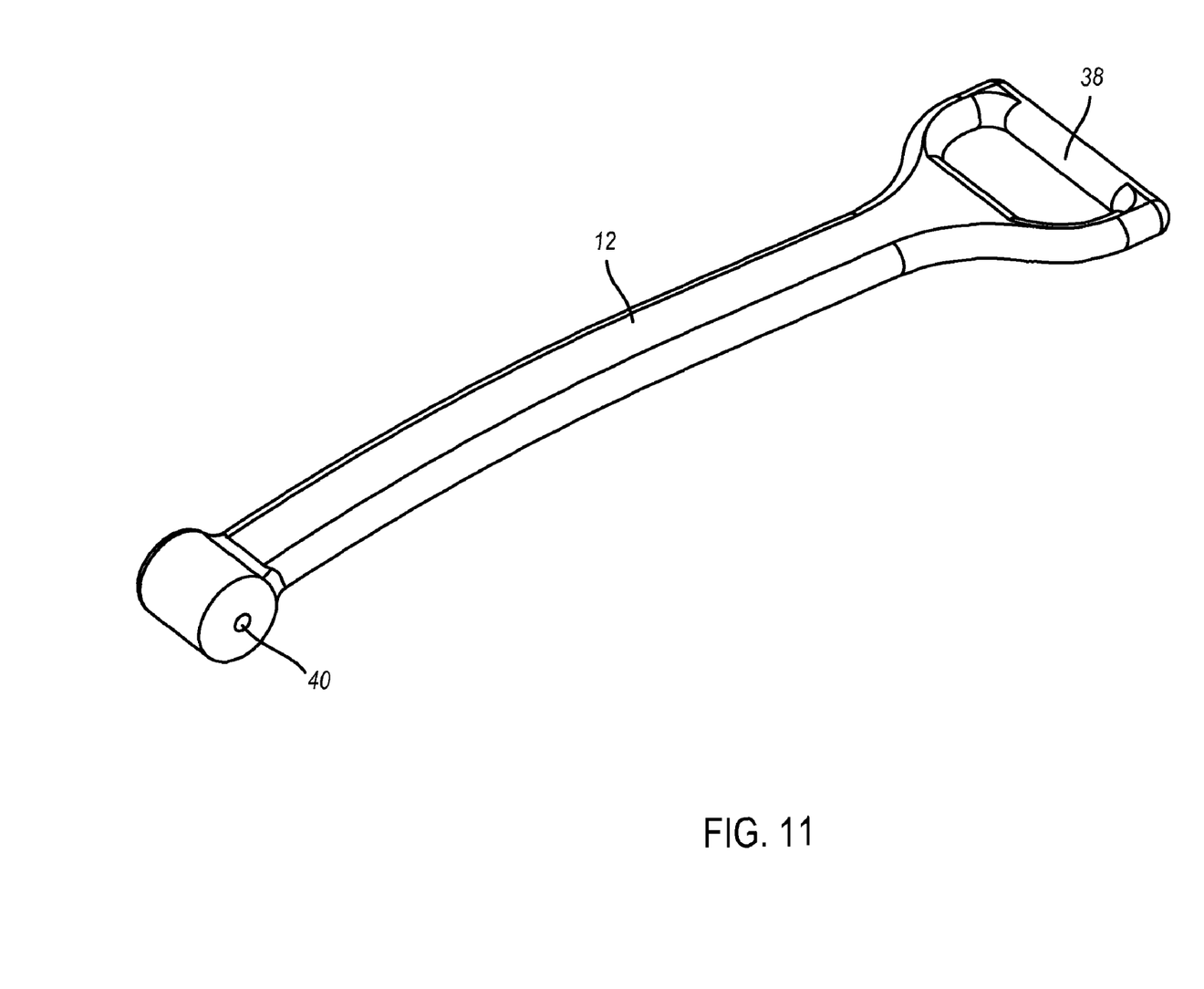
FIG. 11 is a front perspective view of a handle for the multi-use wagon, according to an embodiment of the technology described herein.

The wagon 10 is configured to be operatively pulled by a user grasping grip 38 and pulling handle 12. As depicted specifically in FIG. 11, the handle 12 includes a channel 40 to receive a handle axle (not shown, primarily internal to the channel 40) for attachment to the wagon body 14 and secured by handle axle end cap 42. This preferred connection method to the wagon body 14 enables the handle 12, as guided and directed by an operator, to be raised and lowered about the handle axle and with which to pull the multi-use wagon 10.

The multi-use wagon 10 includes a front seat 26 and a rear seat 24 disposed within the wagon body 14. The rear and front seats 24, 26 are removable from the wagon body 14 as desired and in various useful configurations of the multi-use wagon 10. By way of example, the operator may remove the rear and front seats 24, 26 to maximize the cargo handling ability of the multi-use wagon 10.

Adjacent to the front seat 26 is a forward back-support panel 18. Adjacent to the rear seat 24 is a rear back-support panel 16. The forward and rear back-support panels 18, 16 provide back support when utilized in an extended, upright manner. The forward and rear back-support panels 18, 16 are selectively operable to fold inwardly and create a table top surface 68. By way of example, and as depicted specifically in FIG. 3, the forward and rear back-support panels 18, 16 are folded inwardly to create a table top surface 68.

Figure 8:
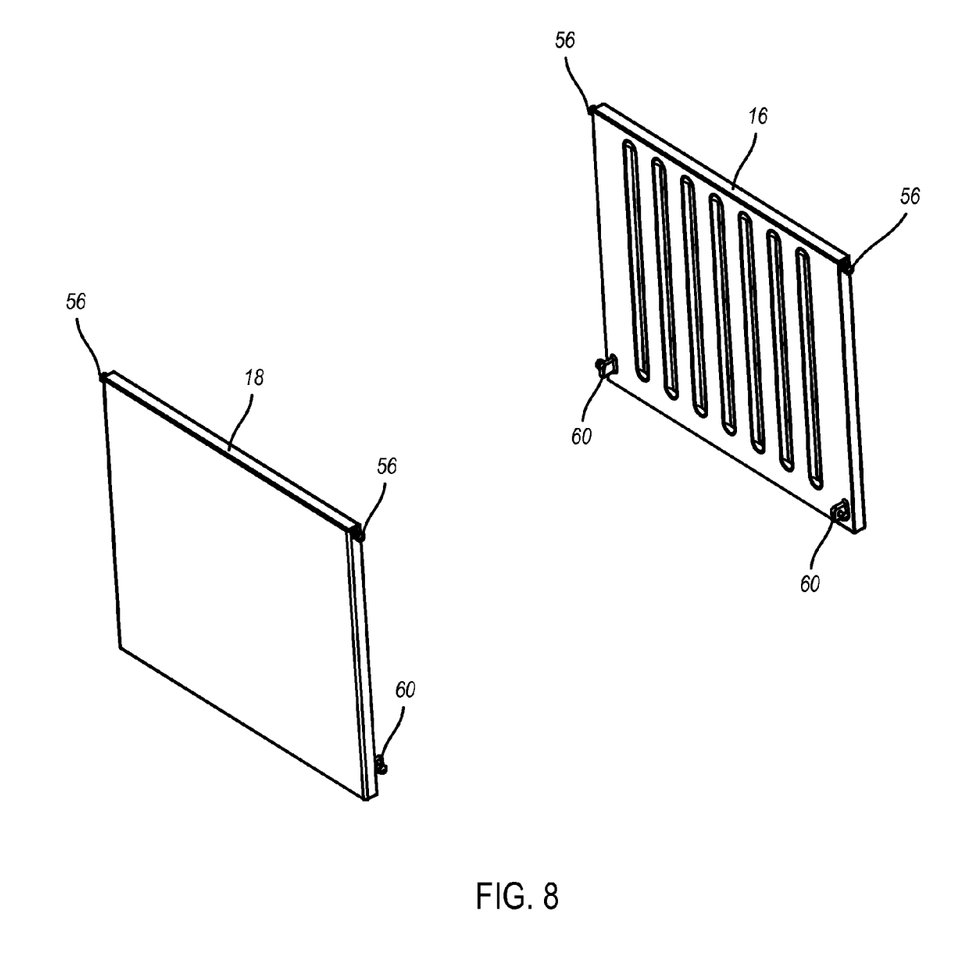
FIG. 8 is a perspective view of the forward back support panel and the rear back support panel, according to an embodiment of the technology described herein.

As depicted specifically in FIG. 8, located on each lower corner of both of the forward back-support panel 18 and the rear back-support panel 16 are back-support panel slides 60. The back-support panel slides 60 provide the forward back-support panel 18 and the rear back-support panel 16 the ability to slide and pivot within a back-support panel track 64. The wagon body 14 is configured with multiple back-support panel tracks 64 to secure each of the forward back-support panel 18 and the rear back-support panel 16.

The multi-use wagon 10 is configured with left and right side panels 20, 22 pivotably coupled to the wagon body 14. The left and right side panels 20, 22 are configured to be operatively placed in one of three positions. In one position, the left and right side panels 20, 22 are placed in a stowed position at a left and right sides, respectively, of the wagon body 14. In a second operatively selected position, the left and right side panels 20, 22 are lifted to provide upper side support to the wagon body 14 while carrying a child or cargo. This position increases safety when children or additional cargo are included within the wagon 10. In a third operatively selected position, the left and right side panels 20, 22 are folded outwardly to provide a right or left side portion, respectively, of the table top surface 68. The multi-use wagon 10 is configured to be easily and operatively interchanged between these three configurations dependent on the passengers, cargo, and other needs of the use of the wagon 10.

As depicted specifically in FIG. 8, each of the forward back-support panel 18 and the rear back-support panel 16 is configured with a pair of back-support panel pins 56. A back-support panel pin 56 is located on each upper end of both the rear back-support panel 16 and forward back-support panel 14. Each back-support panel pin 56 is configured for connectivity with the left and right side panels 20, 22. As depicted specifically in FIG. 4, the forward and rear back-support panels 18, 16 are couple to the left and right side panels 20, 22. Both sets of forward and rear back-support panels 18, 16 and the left and right side panels 20, 22 are shown in an extended, upright position to provide additional structural support to passengers and/or cargo.

Additionally, and in an alternative use, the back-support panel pins 56 on each of the forward back-support panel 18 and the rear back-support panel 16 are inserted into the recess 58 located on the upper, inner rim of the wagon body 14. Each recess 58 is configured to receive one or more back-support panel pins 56. When both of the forward back-support panel 18 and the rear back-support panel 16 are pivoted forward and laid flat to form a table top surface 68, the back-support panel pins 56 are at rest in a recess 58 on each side of the wagon body 14. As depicted specifically in FIG. 3, the forward and rear back-support panels 18, 16 are folded inwardly and the back-support panel pins 56 are at rest in a recess 58 on each side of the wagon body 14 to create a table top surface 68

Figure 10:
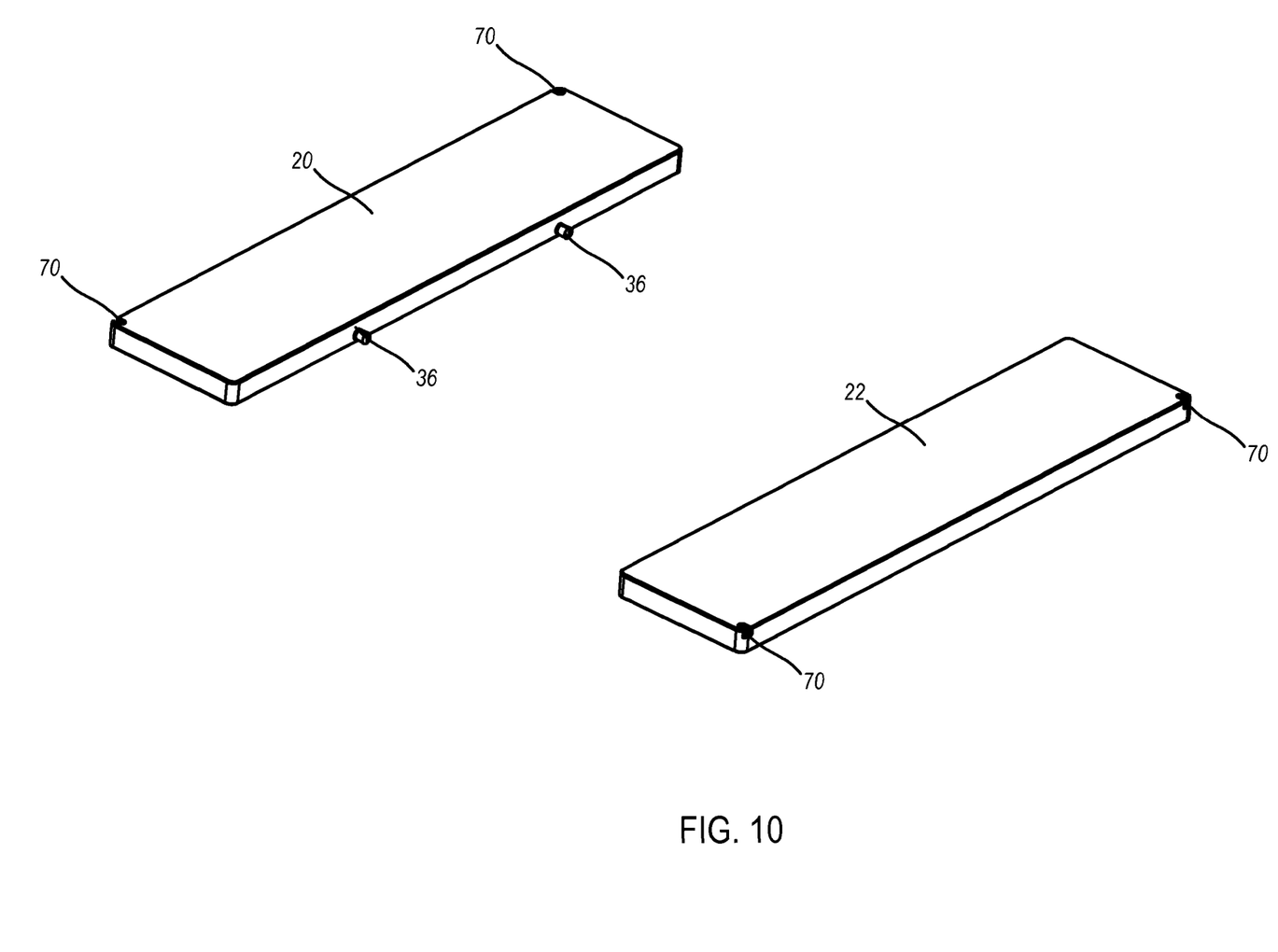
FIG. 10 is a perspective view of the table panels for the multi-use wagon, according to an embodiment of the technology described herein.

As depicted specifically in FIG. 10, each of the left and right side panels 20, 22 is configured with a side panel pin notch 70 at each upper, inner corner of the left side panel 20 and the right side panel 22. Each pin notch 70 is configured to receive one of the back support panel pins 56 and thereby secure the rear and forward back-support panels 16, 18 to the left and right side panels 20, 22, respectively, when the left and right side panels 20, 22 are upwardly extended to the upright position as depicted specifically in FIG. 4.

Figure 1:
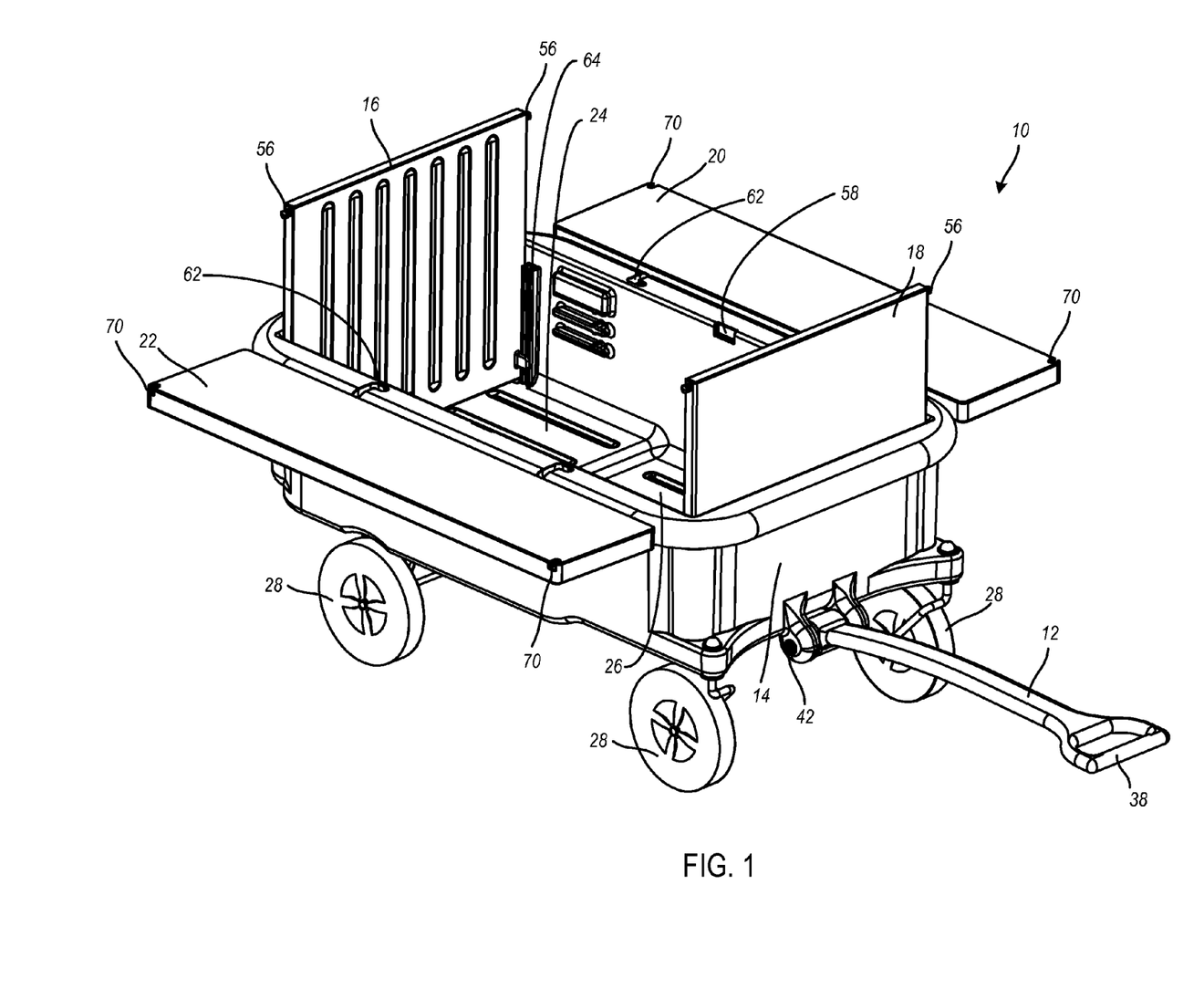
FIG. 1 is a front perspective view of a multi-use wagon, illustrating, in particular, functionality of the wagon for a table and seats, with the table panels in an upright position, according to an embodiment of the technology described herein.
Figure 2:
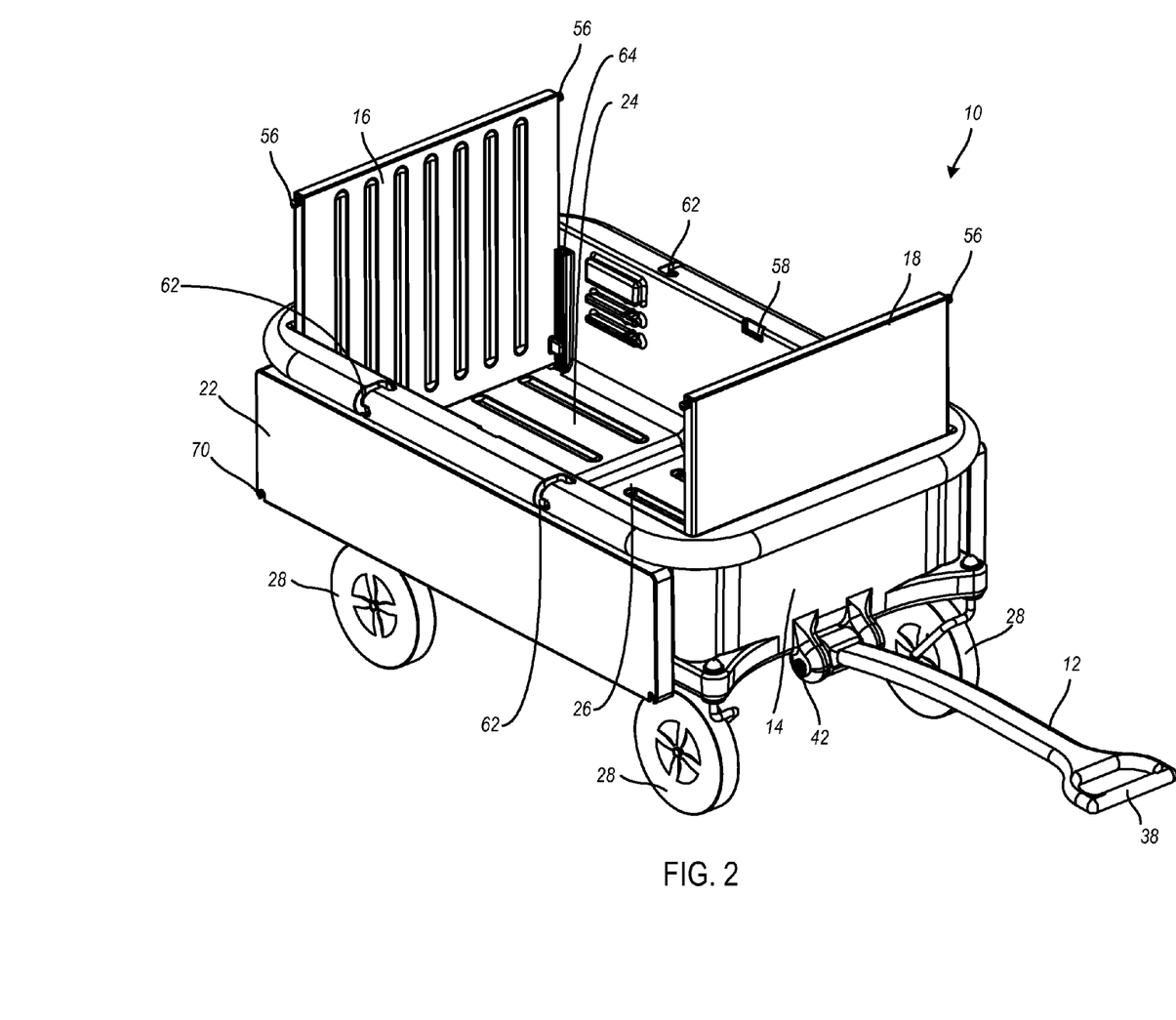
FIG. 2 is a front perspective view of the multi-use wagon depicted in FIG. 1, illustrating, in particular, functionality of the wagon for a table and seats, with the table panels in folded position, according to an embodiment of the technology described herein.
Figure 3:
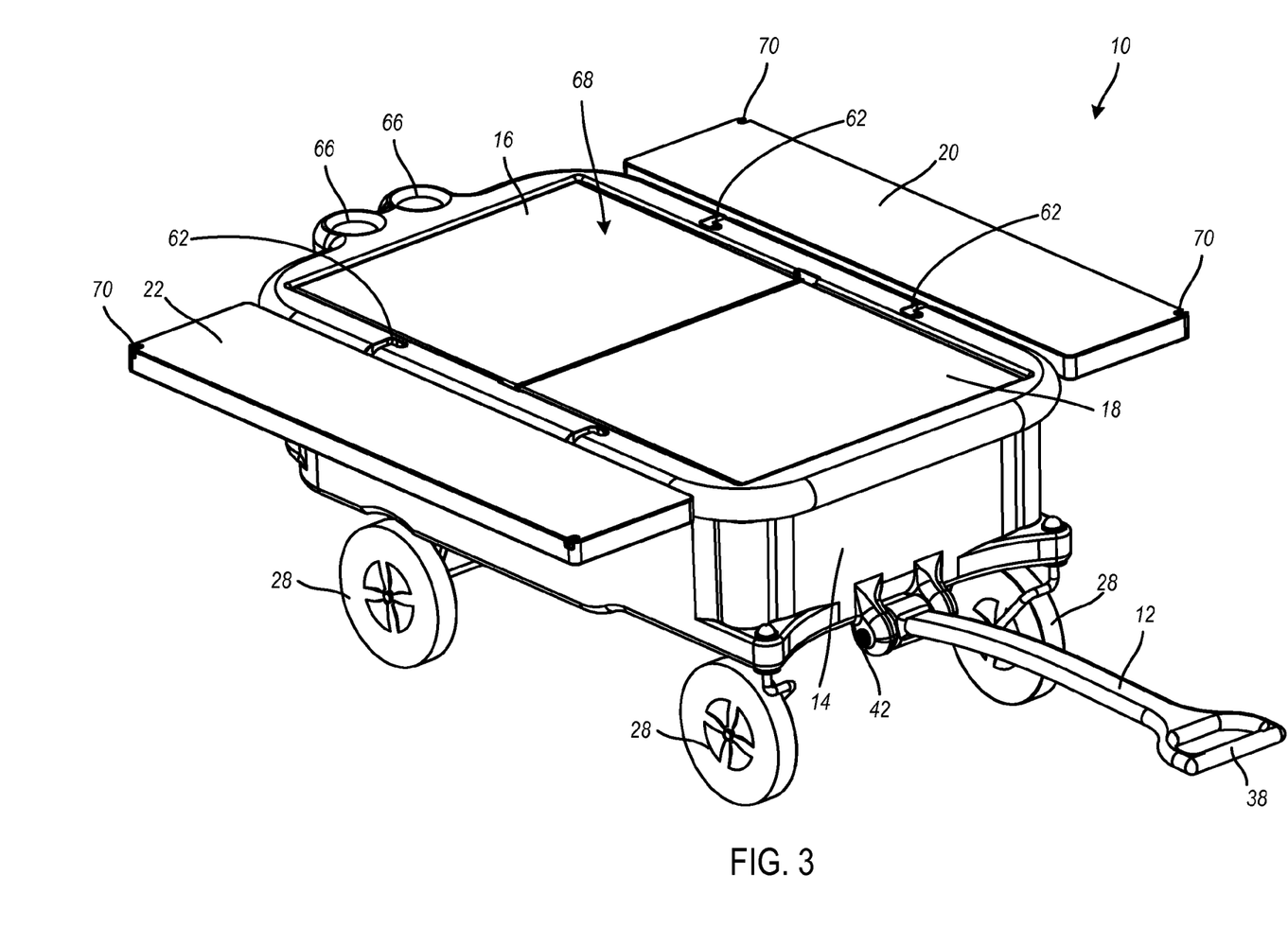
FIG. 3 is a front perspective view of the multi-use wagon depicted in FIG. 1, illustrating, in particular, functionality of the wagon for a table and seats, with the seat backs in a closed position and with the table panels in an upright position, according to an embodiment of the technology described herein.
Figure 4:
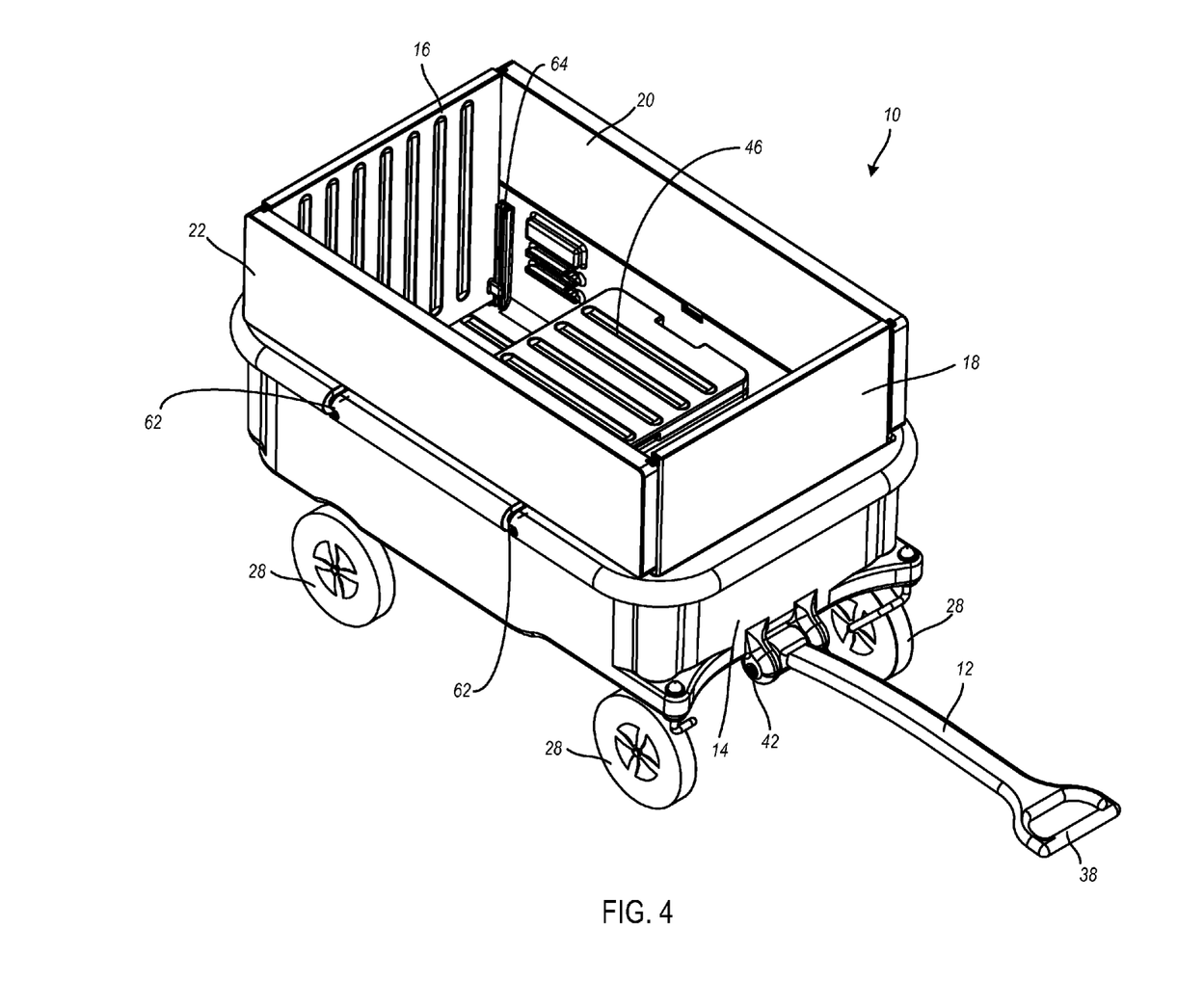
FIG. 4 is a front perspective view of the multi-use wagon depicted in FIG. 1, illustrating, in particular, functionality of the wagon with seat back and table panels extended upwardly, according to an embodiment of the technology described herein.
Figure 5:
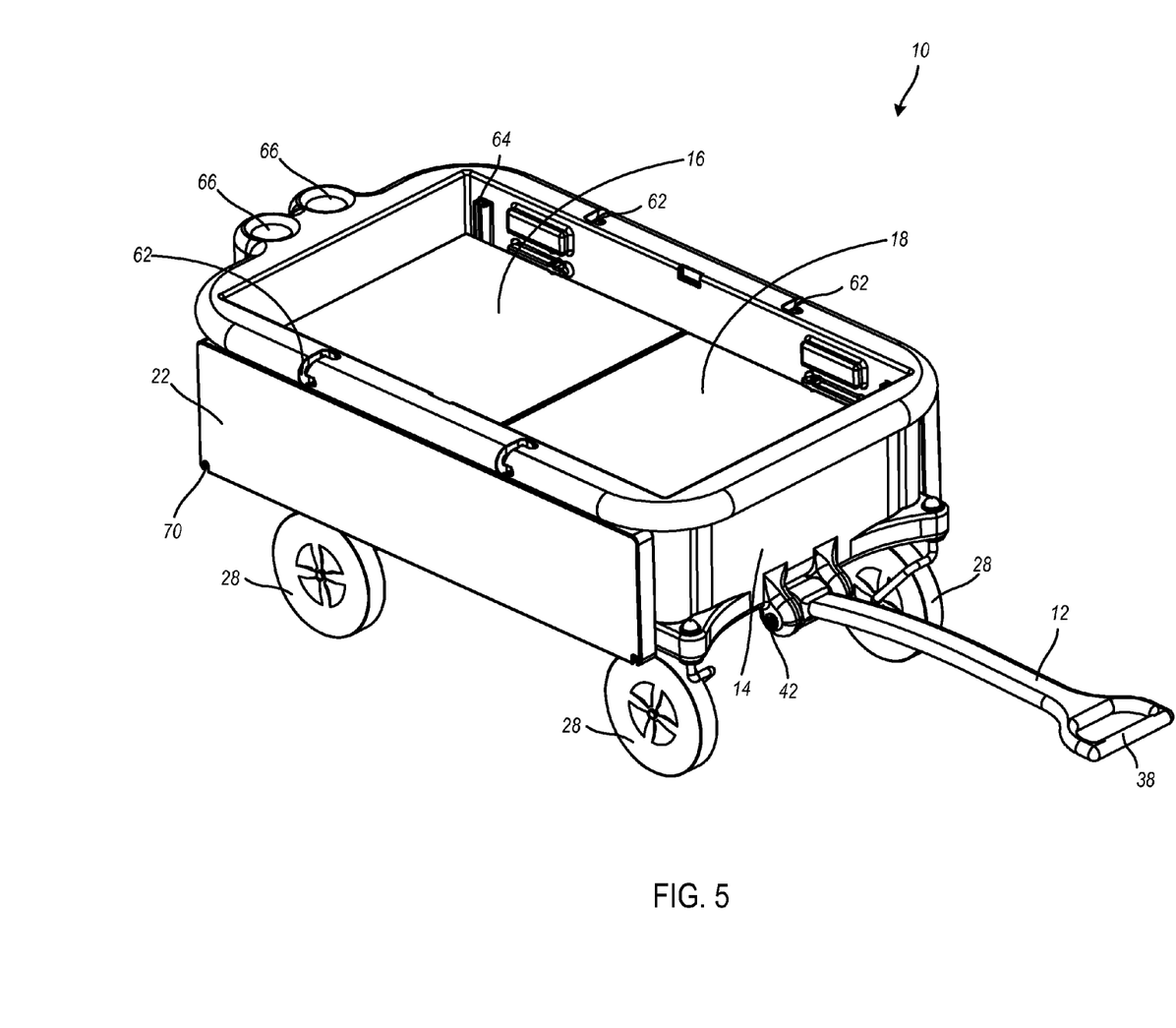
FIG. 5 is a front perspective view of the wagon body, according to an embodiment of the technology described herein.

As depicted specifically in FIG. 10, each of the left and right side panels 20, 22 is configured with at least two pins 36. Pin 36 is disposed on each of the left and right side panels 20, 22 on the underside such that it provides a connectivity point for interchangeable interconnectivity to the wagon body 14 at each side panel track 62. The pins 36 secure each of the left and right side panels 20, 22 in one of the three positions for which each is configured, such as for example, those positions depicted in FIGS. 2, 3, 4, showing the left and right side panels 20, 22 in a stowed, down position, in a table top configuration, and in an upright position, respectively.

Figure 6:
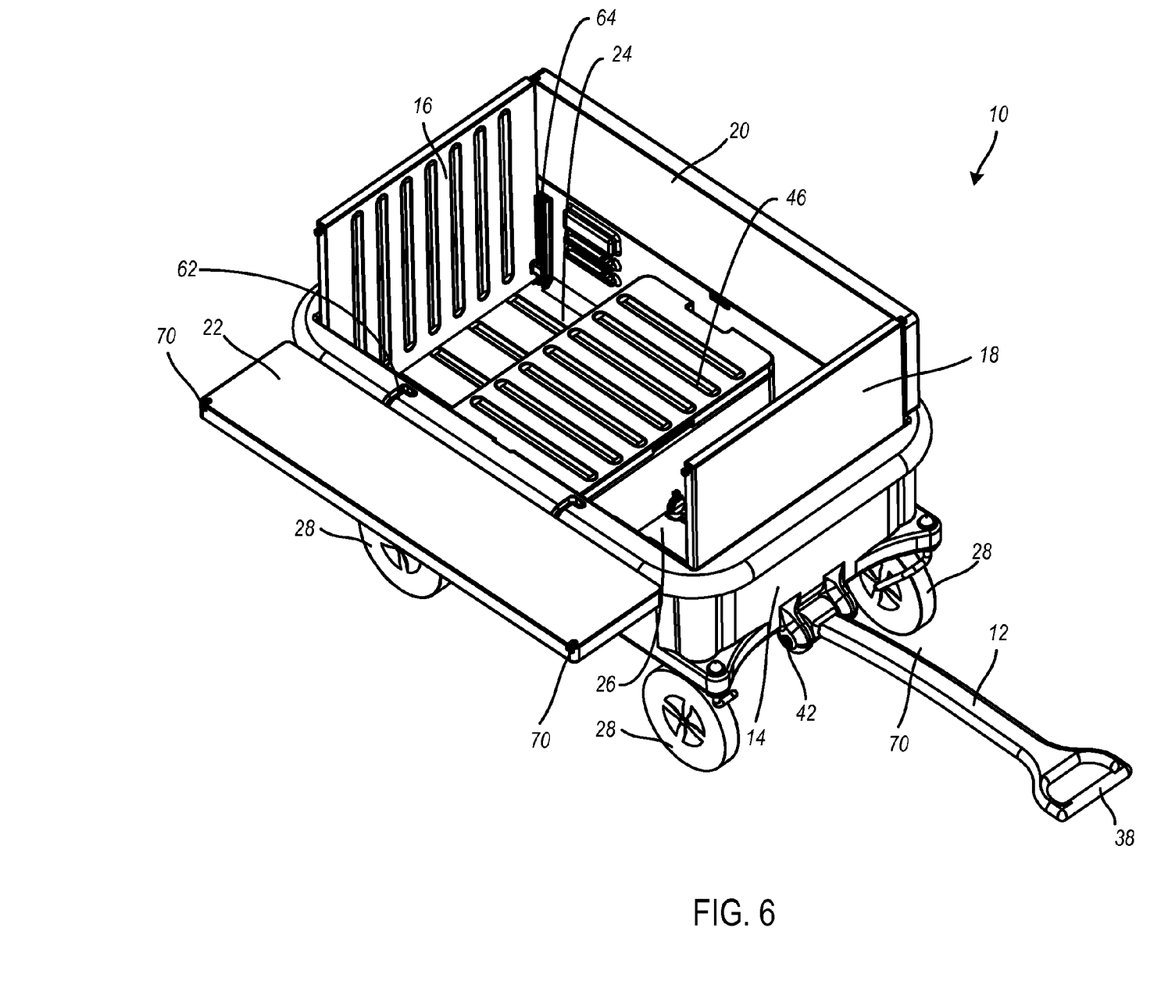
FIG. 6 is a front perspective view of the multi-use wagon depicted in FIG. 1, illustrating, in particular, functionality of the wagon having a removable ice chest, according to an embodiment of the technology described herein.
Figure 7:
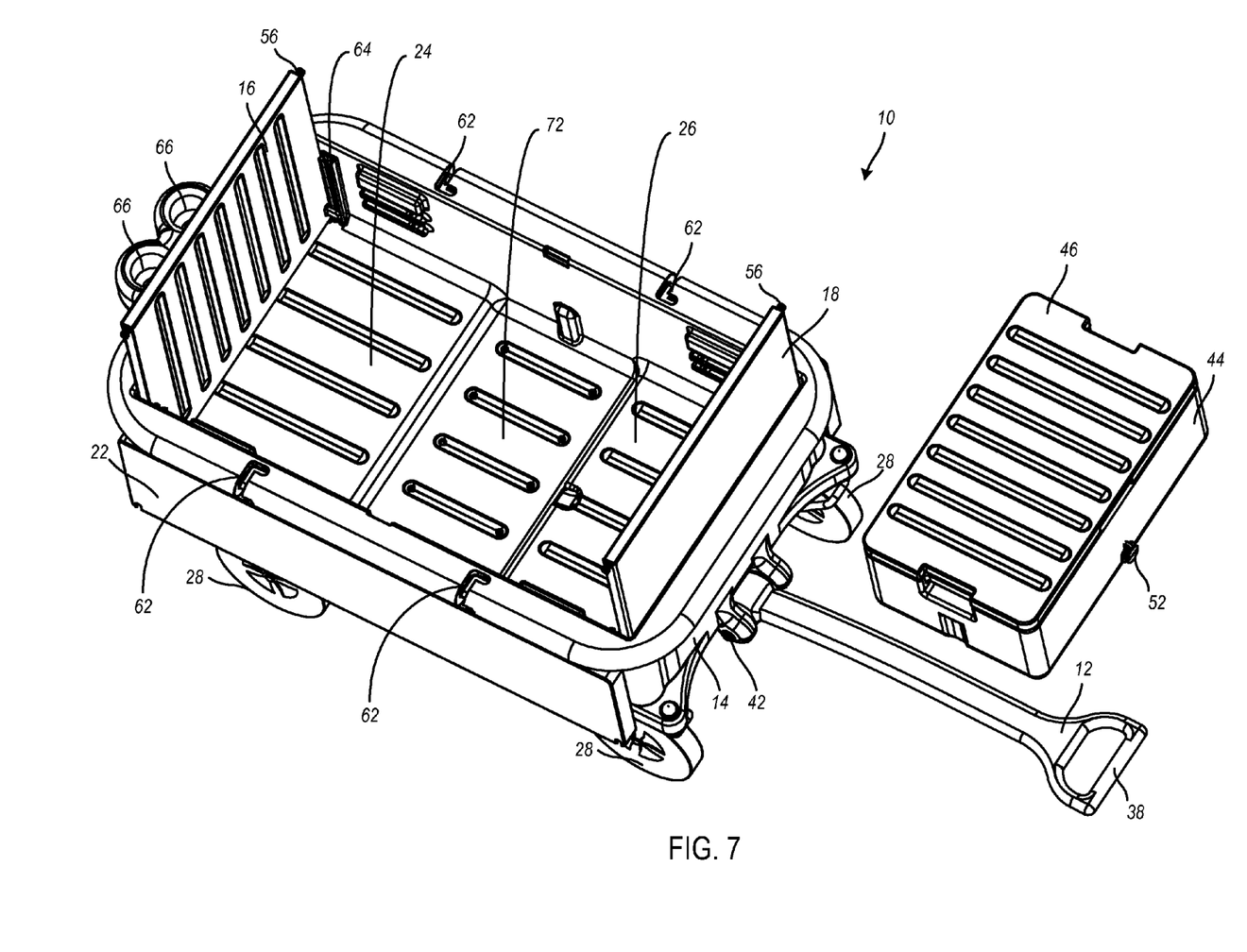
FIG. 7 is a front perspective view of the multi-use wagon depicted in FIG. 1, illustrating, in particular, functionality of the wagon having a removable ice chest and with the ice chest shown removed, according to an embodiment of the technology described herein.
Figure 12:
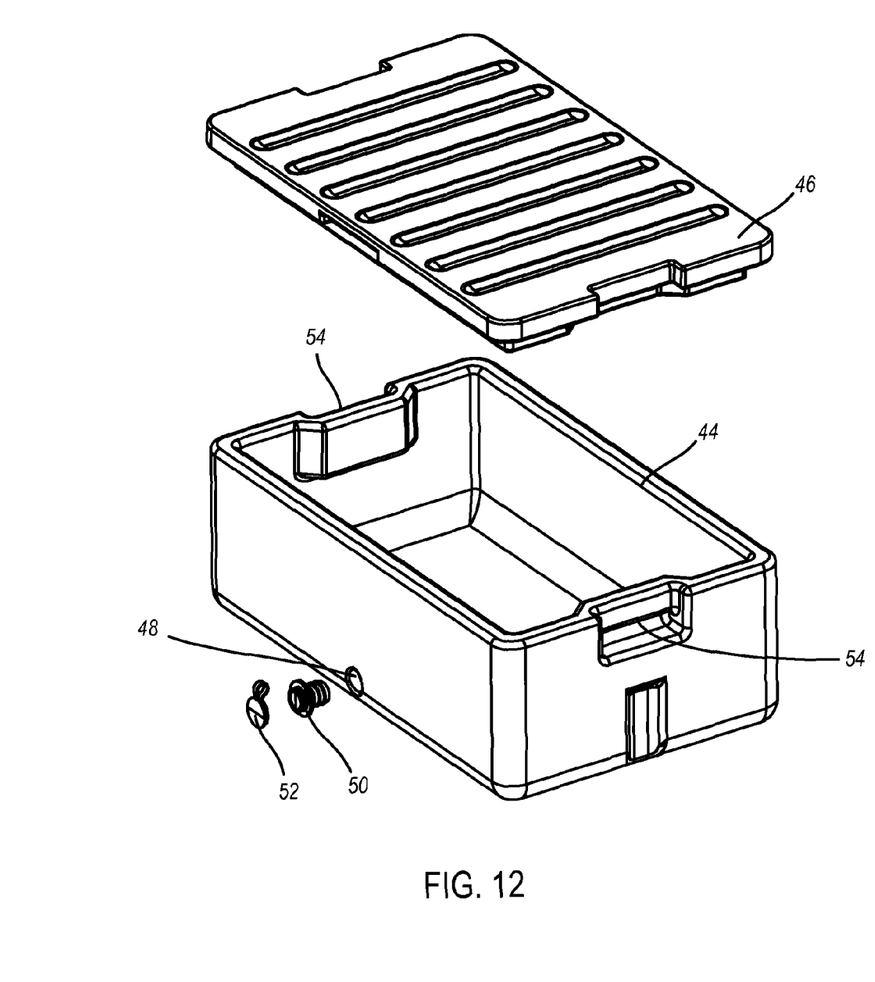
FIG. 12 is a front perspective view of the removable ice chest of the multi-use wagon, illustrating, in particular, the chest, lid, and drain plug, according to an embodiment of the technology described herein.
Figure 13:
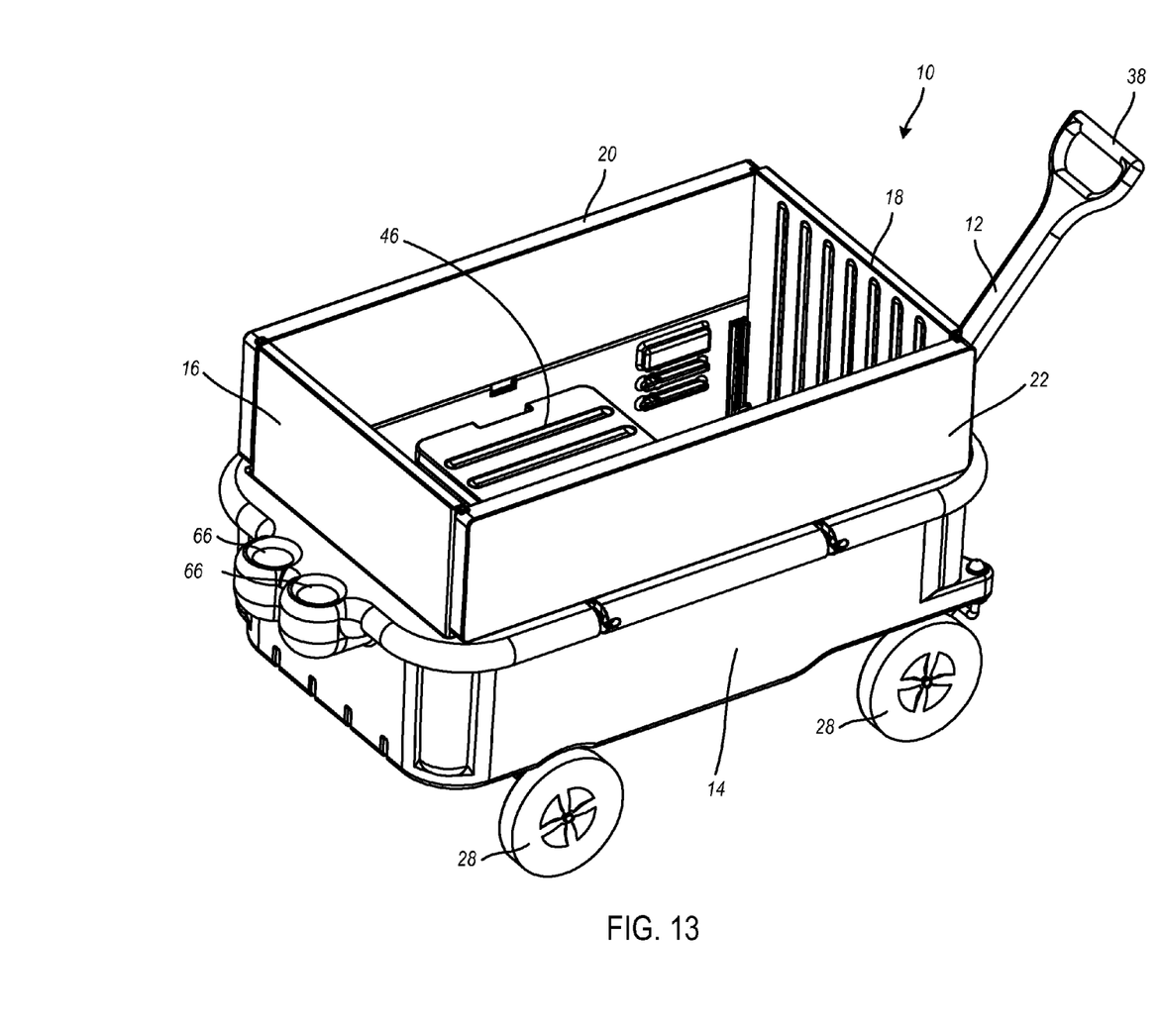
FIG. 13 is a front perspective view of the multi-use wagon depicted in FIG. 1, illustrating, in particular, functionality of the wagon having a removable ice chest, according to an embodiment of the technology described herein.

In reference now to FIG. 12, the multi-use wagon 10 includes an insulated chest 44. The insulated chest can include a base and front, rear, right, and left sides, and a removable lid 46 configured to sealably close a top of the insulated chest 44. The insulated chest 44 can be placed within the wagon body 14 centrally between the front and rear seats 26, 24. For example, as depicted in FIG. 6, the insulated chest 44 can be placed upon wagon floor area 72. As shown, insulated chest 44 is placed centrally between the front seat 26 and the rear seat 24. The insulated chest 44 is removable from the wagon body 14. Optionally, as selected by the operator the insulated chest 44 can be removed. In FIG. 7, the insulated chest 44 is shown removed.

Additionally, as depicted specifically in FIG. 12, the insulated chest 44 includes a drain hole 48 disposed within the insulated chest 44. The insulated chest 44 includes a drain plug 50. The drain plug 50 is configured to sealably close the drain hole 48 of the insulated chest 44. The insulated chest 44 can include a drain cap 52. The insulated chest 44 includes handle 54 at each end of the insulated chest 44.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A wagon comprising:
 a wagon body supported by a plurality of wheels;
 front and rear seats disposed within the wagon body;
 forward and rear back-support panels pivotably coupled to the front and rear seats to provide back support and to selectively fold to create a table top surface by sliding upward and pivoting forward; and
 left and right side panels pivotably coupled to the wagon body, wherein the left and right side panels are configured to be operatively placed in one of three positions: to be used in a stowed position at a left and right sides, respectively, of the wagon body, to be lifted to provide upper side support to the wagon body while carrying a child or cargo, and to operatively fold, outwardly to provide a right or left side portion, respectively, of the table top surface.

2. The wagon of claim 1, wherein the rear and front seats are removable from the wagon body.

3. The wagon of claim 1, further comprising:
 an insulated chest.

4. The wagon of claim 3, wherein the insulated chest comprises a base and front, rear, right, and left sides, and a removable lid configured to sealably close a top of the insulated chest, and wherein the insulated chest is disposed within the wagon body centrally between the front and rear seats.

5. The wagon of claim 4, wherein the insulated chest is removable from the wagon body.

6. A multi-use wagon comprising:
 a wagon body supported by a plurality of wheels and operatively pulled by a handle;
 a rear seat disposed within the wagon body;
 a front seat disposed within the wagon body;
 a rear back-support panel, the rear back-support panel configured to provide back support to a seated child in the rear seat and to fold inwardly to form a rear portion of a table top;
 a forward back-support panel, the forward back-support panel configured to provide back support to a seated child in the front seat and to fold inwardly to form a forward portion of the table top; and
 a left side panel, the left side panel configured to be used in a stowed position at the left side of the wagon body, to be lifted to an upright position to provide left side support to the wagon body while carrying a child or cargo, and to operatively fold, outwardly to provide a left portion of the table top; and
 a right side panel, the right side panel configured to be used in a stowed position at the right side of the wagon body, to be lifted to an upright position to provide right side support to the wagon body while carrying a child or cargo, and to operatively fold, outwardly to provide a right portion of the table top.

7. The multi-use wagon of claim 6, further comprising:
 an insulated chest, the insulated chest having a base and front, rear, right, and left sides and being disposed within the wagon body centrally between the front and rear seats; and
 a lid, the lid configured to enclose the insulated chest at a top side and operatively removable from the insulated chest.

8. The multi-use wagon of claim 7, wherein the insulated chest is removable from the wagon body.

9. The multi-use wagon of claim 7, further comprising:
 a drain hole disposed within the ice chest;
 a drain plug, the drain plug configured to sealably close the drain hole of the insulated chest;
 a drain cap; and
 at least one handle disposed upon the insulated chest.

10. The multi-use wagon of claim 6, wherein the rear and front seats are removable from the wagon body.

11. The multi-use wagon of claim 6, further comprising:
 a back-support panel pin disposed on each upper end of both the rear back-support panel and forward back-support panel; and
 a pin notch disposed on each upper, inner corner of the left side panel and the right side panel, each pin notch configured to receive one of the back support panel pins and thereby secure the rear and forward back-support panels to the left and right side panels, respectively, when the left and right side panels are upwardly extended to the upright position.

12. The multi-use wagon of claim 6, further comprising:
 a plurality of tracks disposed on each of a left and a right side of the wagon body and configured for receipt of the left and right side panels in one of three operatively selected positions.

13. The multi-use wagon of claim 6, further comprising:
a pair of back-support panel tracks for each of the rear and forward back-support panels, each pair of back-support panel tracks disposed within an interior of the wagon body and configured to provide a movement path for the operative placement of the rear and forward back-support panels.

14. A combination, interchangeable children's wagon, ice chest, and table comprising:
a wagon body supported by a plurality of wheels and operatively pulled by a handle, the wagon body having a floor and front, rear, right, and left sides, defining an interior of the wagon body;
a rear seat disposed within the wagon body;
a front seat disposed within the wagon body;
a rear back-support panel, the rear back-support panel configured to provide back support to a seated child in the rear seat and to fold inwardly to form a central rear portion of a table top;
a forward back-support panel, the forward back-support panel configured to provide back support to a seated child in the front seat and to fold inwardly to form a central forward portion of the table top;
a left side panel, the left side panel configured to be used in a stowed position at the left side of the wagon body, to be lifted to provide left side support to the wagon body while carrying a child or cargo, and to operatively fold, outwardly to provide a left portion of the table top;
a right side panel, the right side panel configured to be used in a stowed position at the right side of the wagon body, to be lifted to provide right side support to the wagon body while carrying a child or cargo, and to operatively fold, outwardly to provide a right portion of the table top; and
an insulated chest, the insulated chest being disposed within the wagon body centrally between the front and rear seats and having a lid, the lid configured to enclose the insulated chest at a top side and operatively removable from the insulated chest.

15. The combination, interchangeable children's wagon, ice chest, and table of claim 14, further comprising:
a back-support panel pin disposed on each upper end of both the rear back-support panel and forward back-support panel; and
a pin notch disposed on each upper, inner corner of the left side panel and the right side panel, each pin notch configured to receive one of the back support panel pins and thereby secure the rear and forward back-support panels to the left and right side panels, respectively, when the left and right side panels are upwardly extended to the upright position.

16. The combination, interchangeable children's wagon, ice chest, and table of claim 14, further comprising:
a plurality of tracks disposed on each of a left and a right side of the wagon body and configured for receipt of the left and right side panels in one of three operatively selected positions.

17. The combination, interchangeable children's wagon, ice chest, and table of claim 14, further comprising:
a pair of back-support panel tracks for each of the rear and forward back-support panels, each pair of back-support panel tracks disposed within an interior of the wagon body and configured to provide a movement path for the operative placement of the rear and forward back-support panels.

18. The combination, interchangeable children's wagon, ice chest, and table of claim 14, wherein the rear and front seats are removable from the wagon body, and wherein the insulated chest is removable from the wagon body.

* * * * *